Dec. 9, 1947.  H. B. CARBON  2,432,225
VALVE ASSEMBLY
Filed Dec. 1, 1944   2 Sheets-Sheet 1

Inventor
Harry B. Carbon

By Mason, Porter & Diller
Attorneys

Dec. 9, 1947.    H. B. CARBON    2,432,225
VALVE ASSEMBLY
Filed Dec. 1, 1944    2 Sheets-Sheet 2

Inventor
Harry B. Carbon
By
Mason, Porter & Diller
Attorneys

Patented Dec. 9, 1947

2,432,225

UNITED STATES PATENT OFFICE 2,432,225

VALVE ASSEMBLY

Harry B. Carbon, Cleveland, Ohio, assignor to The Parker Appliance Company, Cleveland, Ohio, a corporation of Ohio Application December 1, 1944, Serial No. 566,173

5 Claims. (Cl. 251—102)

The invention relates to certain new and useful improvements in a valve assembly of the type wherein is provided a casing having ports and a rotor bore therein, and a rotor in said bore including a flow passage and turnable to selective positions for controlling said ports.

An object of the invention is to provide a novel valve assembly of the character stated wherein is provided a rotor which is divided into segments the outer faces of which conform to and make liquid-tight contact in the rotor bore, and wherein said segments are yieldably pressed into contact with the rotor bore wall by an expander sleeve mounted in a flow passage formed through said segments.

Another object of the invention is to provide a valve assembly of the character stated in which the expander sleeve comprises a split sleeve the split in which is placed in registry with the downwardly directed opening between the rotor segments so that bits of debris coming into the rotor flow passage may fall out of said passage, and wherein the rotor bore is closed at its lower end by a cup-like closure cap in which the bits of debris falling through the sleeve split can collect.

With the above and other objects in view that will hereinafter appear, the nature of the invention will be more clearly understood by reference to the following detailed description, the appended claims, and the several views illustrated in the accompanying drawings.

Figure 2:
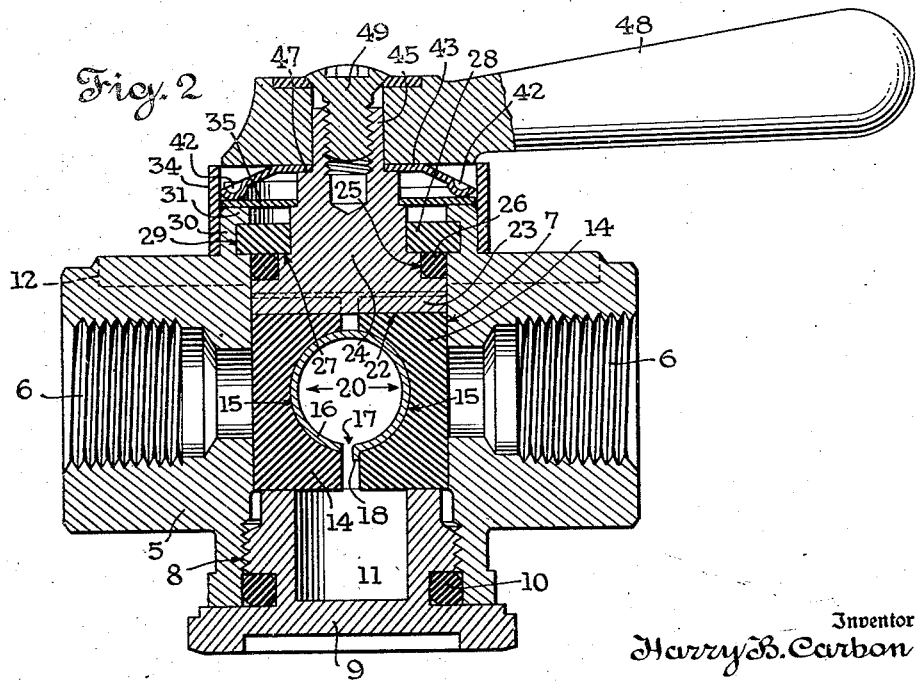
Figure 2 is a vertical cross sectional view taken through the axis of the casing ports, the rotor being placed in the cutoff position.

In the example of embodiment of the invention herein disclosed, the improved valve assembly includes a casing 5 having two axially aligned diametrically oppositely disposed ports 6 and a rotor bore 7 extending through the top and bottom of the casing in the manner clearly illustrated in Figure 2.

The rotor bore 7 includes an internally threaded enlargement 8 at the lower end thereof, and a closure plug 9 is threadably mounted in said end for closing the bottom of the casing. The plug 9 is provided with an annular groove in which is mounted a sealing ring 10 effective to seal the bottom of the rotor bore, and the plug is cup-like in shape so as to provide a debris collecting receptacle 11, the purpose of which will become apparent as this description progresses.

The valve casing also is equipped with side and corner flange extensions 12 which are apertured as at 13 to facilitate mounting of the valve at a place of use.

The rotor which is rotatably mounted in the rotor bore 7 is composed of two segments 14 having formed between them a flow passage 15 in which is mounted an expander sleeve 16. It will be apparent by reference to Figures 2, 4 and 5 of the drawings that the expander sleeve is longitudinally split as at 17 to provide an opening through which bits of debris coming into the flow passage defined by the inner diameter of the sleeve can fall, through the space intervening the segments 14 and into the receptacle 11 formed in the bottom closure plug 9. The sleeve is provided with an outwardly turned flange 18 which engages one of the rotor segments 14 in the manner illustrated in Figure 2 and serves to maintain the registry of the sleeve split 17 with the debris collecting receptacle 11.

It is to be understood that the rotor bore 7 is accurately bored and also ground or honed to form a very smooth and accurate cylindrical surface. It will also be apparent by reference to Figure 5 of the drawings that the expander sleeve 16 is normally of slightly greater dimension as at 19 than the internal diameter of the flow passage 15 formed between the rotor segments 14, and thus the expander sleeve, when mounted in the manner illustrated in Figure 2, constantly exerts a maximum separating force indicated by the arrows 20 for tightly pressing the external cylindriform surfaces of the rotor in sealing contact in the rotor bore. The rotor segments preferably are formed of non-metallic material. An example of such material is the carbon and graphite combination known to the trade as "Graphitar."

Figure 3:
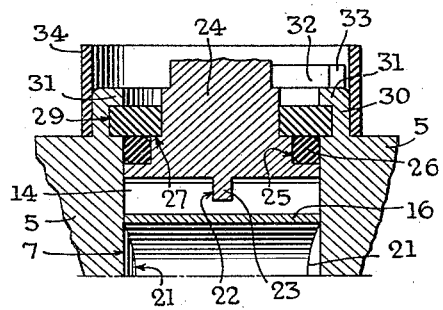
Figure 3 is a fragmentary sectional view taken through the rotor in a plane at right angles to the plane of the section in Figure 2.
Figure 4:
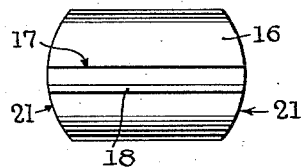
Figure 4 is a detail side elevation of the rotor segment expander sleeve.
Figure 5:
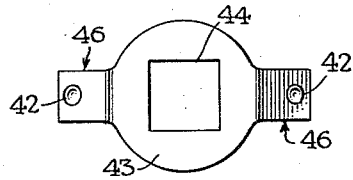
Figure 5 is an end view of the sleeve shown in Figure 4.

It will be apparent by reference to Figures 3 and 4 that the ends of the expander sleeve 16 are shaped as at 21 to conform to the outside curvature of the rotor segments.

A groove way 22 is formed in the upper ends of the rotor segments 14, said groove way being extended in right angular relation to the break or space between said segments. The groove way 22 serves to receive a turning tongue depending from an actuator stem 24 as illustrated in Figures 2 and 3 of the drawings. The stem 24 is reduced in diameter as at 25 to provide a peripheral recess in which to receive a sealing ring 26. The stem 24 has another reduced diameter portion providing a shoulder 27 engageable with a retainer ring 28 which is mounted in a counterbore 29 formed in the upper portion of the casing about the rotor bore 7 and which serves to provide a narrow annular upstanding flange 30.

Figure 1:
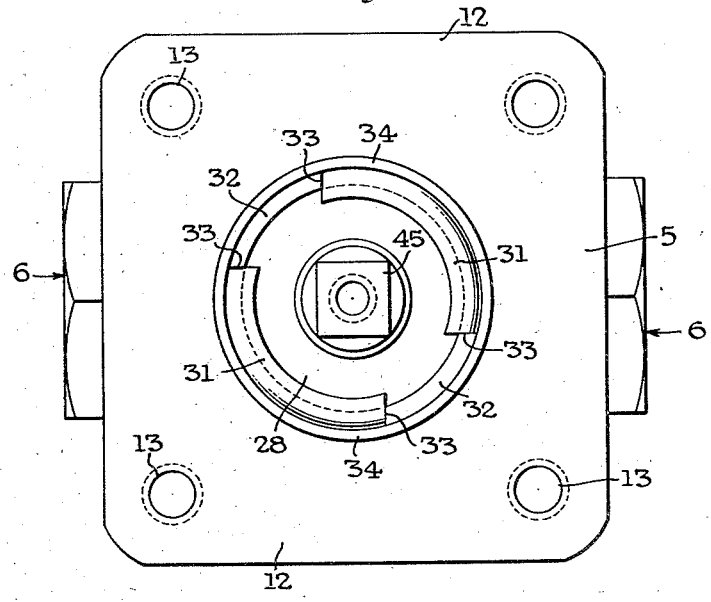
Figure 1 is a plan view illustrating a valve structure embodying the invention, the actuator handle and the indexing means being removed.

The annular flange 30 is split at four points to provide two diametrically oppositely disposed segments 31 which are bent over in the manner clearly illustrated in Figures 1, 2 and 3 to retain the retainer ring 28 in its position in the base of the counterbore providing the flange 30. The splitting of the flange 30 also provides two diametrically oppositely disposed full height segments 32 providing abutment shoulders 33. A ring 34 surrounds the flange 30 and extends thereabove to provide an indexing means receiving well.

Figure 6:
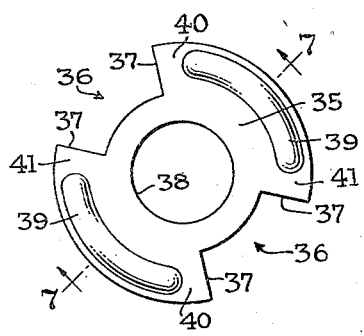
Figure 6 is a plan view illustrating the stationary plate of the indexing means.
Figure 7:
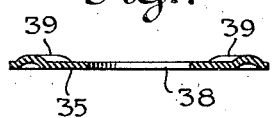
Figure 7 is a detail section taken on the line 7—7 on Figure 6.

Any suitable indexing means may be employed, and the indexing means herein disclosed as an example is claimed in another disclosure. This indexing means includes a plate 35 illustrated in detail in Figures 6 and 7 of the drawings and having two diametrically oppositely disposed peripheral clearances 36 of a size to receive the full height flange segments 32, said clearances providing edge abutments 37 which are engageable with the shoulders 33 of the casing segments 32 for the purpose of holding the plate 35 stationary. The plate is provided with a center bore 38 which loosely surrounds the portion of the rotor actuating stem extending upwardly therethrough in the manner illustrated in Figure 2. The plate 35 also includes two arcuate raised portions 39 of such length and so placed as to provide detent rest portions arranged in two diametrically oppositely disposed pairs 40, 40 and 41, 41.

Figure 8:
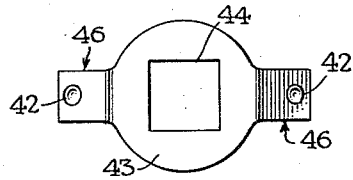
Figure 8 is a plan view of the movable member of the detent means.
Figure 9:
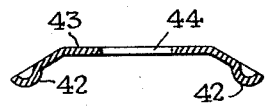
Figure 9 is a vertical longitudinal sectional view of the member illustrated in Figure 8.

The stationarily held plate arcs 39 are engageable between downturned spring button ends 42 of a detent member which is illustrated in detail in Figures 8 and 9 and mounted as illustrated in Figure 2. The member 43 has a noncircular central aperture 44 which surrounds the noncircular stem portion 45 of the rotor actuator stem. Thus the detent member 43 is caused to turn with the actuator stem, and the lateral stop edges 46 provided at the ends thereof engage as stop means with the abutment shoulders 33 provided on the full height casing segments 32. The rotor actuating stem is provided with a shoulder 47 on which the detent member 43 rests, and the actuator handle 48 rests upon the member 43 and a screw 49 serves to securely fix the handle 48 and the detent member 43 on the rotor actuating stem.

In operation the spring button ends 42 of the detent member 43 yieldably engage the stationary plate 35 at 40, 40 or 41, 41 at the respective ends of the raised arcuate portions 39 of said plate so as to yieldably hold the rotor in the valve closed position illustrated in Figure 2, or in the valve open position in which the rotor is turned 90° so as to align the rotor flow passage with the casing ports 6. When the rotor is turned in the proper direction, the raised surfaces 39 displace the yieldable end extensions of the detent member 43 upwardly, as viewed in Figure 2, and when the rotor reaches either of the valve open or valve closed positions above referred to, said yieldable ends 42 will drop off the arcuate raised portions 39 and engage the ends thereof for yieldably retaining the rotor in its positions of adjustment.

While one form of the invention has been shown for purposes of illustration it is to be clearly understood that various changes in the details of construction and arrangement of parts may be made without departing from the spirit and scope of the invention as defined in the appended claims.

I claim:

1. In a valve assembly, a casing having two diametrically oppositely disposed ports and a rotor bore traversing said ports, a rotor rotatably mounted in said bore and composed of two segments having opposed half bore portions together forming a flow passage and turnable to selective positions for opening or closing said ports, and an expander sleeve mounted in and lining said flow passage and yieldably pressing said segments in sealing contact against the walls of the rotor bore.

2. In a valve assembly, a casing having two diametrically oppositely disposed ports and a rotor bore traversing said ports, a rotor rotatably mounted in said bore and composed of two segments having opposed half bore portions together forming a flow passage turnable with the rotor to selective positions for opening or closing said ports, the outer faces of said rotor conforming to the opposing walls of the rotor bore and the inner faces thereof being spaced and substantially parallel each other, and an expander sleeve mounted in said half bore portions and yieldably pressing said segments in sealing contact against the walls of the rotor bore, said sleeve having an opening therein aligned with the space between the rotor segments and through which bits of debris coming into the rotor flow passage can fall.

3. In a valve assembly, a casing having two diametrically oppositely disposed ports and a rotor bore traversing said ports, a rotor rotatably mounted in said bore and composed of two segments having opposed half bore portions together forming a flow passage turnable with the rotor to selective positions for opening or closing said ports, the outer faces of said rotor conforming to the opposing walls of the rotor bore and the inner faces thereof being spaced and substantially parallel each other, and a split expander sleeve mounted in said half bore portions and forming a generally cylindriform flow passage continuous except for the split disposed in alignment with the space between the rotor, said sleeve constantly and yieldably pressing the rotor segments against the walls of the rotor bore and including a flange portion extending into the space between the rotor segments.

4. In a valve assembly, a casing having two diametrically oppositely disposed ports and a rotor bore traversing said ports, a rotor rotatably mounted in said bore and composed of two segments having opposed half bore portions together forming a flow passage turnable with the rotor to selective positions for opening or closing said ports, the outer faces of said rotor conforming to the opposing walls of the rotor bore and the inner faces thereof being spaced and substantially parallel each other, an expander sleeve mounted in said half bore portions and yieldably pressing said segments in sealing contact against the walls of the rotor bore, said sleeve having an opening therein aligned with the space between the rotor segments and through which bits of debris coming into the rotor flow passage can fall, and a closure for the bottom of the rotor bore having a receptacle therein in which to receive said falling bits of debris.

5. In a valve assembly, a casing having two diametrically oppositely disposed ports and a rotor bore traversing said ports, a rotor rotatably mounted in said bore and composed of two segments having opposed half bore portions together forming a flow passage turnable with the rotor to selective positions for opening or closing said ports, the outer faces of said rotor conforming to the opposing walls of the rotor bore and the inner faces thereof being spaced and substantially parallel each other, a split expander sleeve mounted in said half bore portions and forming a generally cylindriform flow passage continuous except for the split disposed in alignment with the space between the rotor, said sleeve constantly and yieldably pressing the rotor segments against the walls of the rotor bore and including a flange portion extending from the sleeve split downwardly into the space between the rotor segments, and a closure for the bottom of the rotor bore having a receptacle therein in which to receive bits of debris coming into the rotor flow passage and falling through the opening in said sleeve.

HARRY B. CARBON.

REFERENCES CITED

The following references are of record in the file of this patent:

UNITED STATES PATENTS

| Number | Name | Date |
| --- | --- | --- |
| 1,018,560 | Hemme | Feb. 27, 1912 |
| 1,947,637 | Bolster | Feb. 20, 1934 |
| 72,529 | Murray | Dec. 24, 1867 |
| 2,282,455 | Church | May 12, 1942 |

FOREIGN PATENTS

| Number | Country | Date |
| --- | --- | --- |
| 552,496 | Great Britain | Apr. 9, 1943 |